United States Patent
Savian et al.

(10) Patent No.: US 9,567,082 B2
(45) Date of Patent: Feb. 14, 2017

(54) ATTACHMENT ASSEMBLY FOR A TOILET MODULE

(71) Applicant: C&D ZODIAC, INC., Huntington Beach, CA (US)

(72) Inventors: Scott Savian, Huntington Beach, CA (US); Ian Geoffrey Scoley, Huntington Beach, CA (US); Eric Long, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 14/668,770

(22) Filed: Mar. 25, 2015

(65) Prior Publication Data

US 2015/0274297 A1 Oct. 1, 2015

Related U.S. Application Data (60) Provisional application No. 61/971,495, filed on Mar. 27, 2014, provisional application No. 62/110,380, filed on Jan. 30, 2015.

(51) Int. Cl.
*B64D 11/02* (2006.01)

(52) U.S. Cl.
CPC .................. *B64D 11/02* (2013.01)

(58) Field of Classification Search
CPC ......... B64D 11/00; B64D 11/02; A47B 96/06; A47B 96/061; A47F 5/08
USPC ............... 49/475.1, 489.1, 493.1; 248/205.3, 248/220.21, 222.52, 235, 240
See application file for complete search history.

(56) References Cited

U.S. PATENT DOCUMENTS

| | | | | |
|---|---|---|---|---|
| 2,933,782 A | * | 4/1960 | Cornell | E06B 7/2316 49/469 |
| 2,980,919 A | | 4/1961 | Otto | |
| 3,070,856 A | | 1/1963 | Minick | |
| 3,178,070 A | | 4/1965 | Leland | |
| 4,341,255 A | | 7/1982 | Mock | |
| 4,691,887 A | * | 9/1987 | Bessinger | A47B 96/065 108/108 |
| 4,733,843 A | * | 3/1988 | Bessinger | A47K 1/08 108/152 |
| 4,738,426 A | * | 4/1988 | Bessinger | A47K 1/08 108/152 |
| 4,871,136 A | * | 10/1989 | Bessinger | A47B 96/065 108/108 |
| 5,064,158 A | * | 11/1991 | Brazier | A47B 96/063 108/152 |
| 6,381,904 B1 | | 5/2002 | Tedescucci | |

(Continued)

OTHER PUBLICATIONS

International Search Report issued on Aug. 28, 2015 in PCT/US15/22553.

*Primary Examiner* — Erin Deery
(74) *Attorney, Agent, or Firm* — Jeffer Mangels Butler & Mitchell LLP; Brennan C. Swain, Esq.

(57) ABSTRACT

A toilet module attachment assembly that includes a retainer member that is adapted to be secured to a wall and a seal member. The retainer member includes a wall attachment flange and a press fit portion extending generally inwardly from the wall attachment flange. When the retainer member is secured to a wall a channel is defined between the wall and the press fit portion. The seal member includes a receiving portion having a groove defined therein and a bulge portion that is received in the channel of the retainer member.

11 Claims, 12 Drawing Sheets

(56) References Cited

U.S. PATENT DOCUMENTS

2011/0000011 A1    1/2011  Gebka
2012/0090777 A1*  4/2012  Braun .................. F16B 11/006
                                                  156/275.5

* cited by examiner

ATTACHMENT ASSEMBLY FOR A TOILET MODULE

CROSS REFERENCE TO RELATED APPLICATIONS

This application claims the benefit of U.S. Provisional Application No. 61/971,495, filed Mar. 27, 2014, and U.S. Provisional Application No. 62/110,380, filed Jan. 30, 2015, which are both incorporated by reference herein in their entireties.

FIELD OF THE INVENTION

The present invention relates generally to a toilet module, and more particularly to a toilet module for use with a lavatory module in an aircraft.

BACKGROUND OF THE INVENTION

Commercial aircraft, such as the Airbus A320 or Boeing 737, are typically constructed from modular components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew that include a toilet therein. Cleaning of and replacement of the toilet can often prove difficult.

SUMMARY OF THE PREFERRED EMBODIMENTS

In accordance with a first aspect of the present invention there is provided a toilet module attachment assembly that includes a retainer member that is adapted to be secured to a wall and a seal member. The retainer member includes a wall attachment flange and a press fit portion extending generally inwardly from the wall attachment flange. When the retainer member is secured to a wall a channel is defined between the wall and the press fit portion. The seal member includes a receiving portion having a groove defined therein and a bulge portion that is received in the channel of the retainer member. In a preferred embodiment, the press fit portion includes a lip and the bulge portion includes an innermost peak. When the retainer member is secured to a wall a first width is defined between the lip and the wall and a second width is defined between the innermost peak of the bulge portion and the wall and the first width is less than the second width. Preferably, the groove faces generally inwardly and wherein the bulge portion extends generally downwardly.

In a preferred embodiment, the attachment assembly includes a hook connection at a bottom thereof. The hook connection preferably includes a first hook on the retainer member and a second hook on the seal member that are engaged with one another. The first and second hooks preferably each include a ramp portion.

In a preferred embodiment, the seal member includes at least one protrusive portion extending generally downwardly therefrom that is received in a notch defined in the press fit portion. Preferably, the seal member also includes at least one cylindrical protrusive portion extending generally inwardly therefrom that is received in a notch defined in the press fit portion. In a preferred embodiment, the wall attachment flange includes a plurality of inserts extending outwardly therefrom.

In accordance with another aspect of the present invention there is provided a toilet module including a shroud that includes first and second opposite edges and a toilet associated therewith. The first attachment assembly includes a retainer member that is adapted to be secured to a wall and that includes a wall attachment flange and a press fit portion extending generally inwardly from the wall attachment flange. When the retainer member is secured to a wall a channel is defined between the wall and the press fit portion. The first attachment assembly also includes a seal member that includes a receiving portion having a groove defined therein and a bulge portion that is received in the channel of the retainer member. The first edge of the shroud is received in the groove. The second attachment assembly includes a retainer member that is adapted to be secured to a wall and that includes a wall attachment flange and a press fit portion extending generally inwardly from the wall attachment flange. When the retainer member is secured to a wall a channel is defined between the wall and the press fit portion. The second attachment assembly also includes a seal member that includes a receiving portion having a groove defined therein and a bulge portion that is received in the channel of the retainer member. The second edge of the shroud is received in the groove.

In accordance with another aspect of the present invention there is provided a method of securing a toilet module between opposing first and second walls. The toilet module includes a shroud having first and second opposite edges and a toilet associated therewith, a first retainer member secured to the first wall, and a second retainer member secured to the second wall. The method includes the steps of (a) inserting the first edge of the shroud into a groove defined in a first seal member, (b) inserting the second edge of the shroud into a groove defined in a second seal member, (c) press fitting a bulge portion of the first seal member into a channel defined in the first retainer member, and (d) press fitting a bulge portion of the second seal member into a channel defined in the second retainer member.

In a preferred embodiment, the method further includes engaging a first hook on the first retainer member with a second hook on the first seal member, and engaging a first hook on the second retainer member with a second hook on the second seal member. The method also preferably includes engaging a ramp portion of the second hook on the first seal member with a ramp portion of the first hook on the first retainer member, whereby the second hook slides over the first hook, and engaging a ramp portion of the second hook on the second seal member with a ramp portion of the first hook on the second retainer member, whereby the second hook slides over the first hook.

In a preferred embodiment, the method includes inserting a protrusive portion extending generally downwardly from the first seal member into a notch defined in the first retainer member, and inserting a protrusive portion extending generally downwardly from the second seal member into a notch defined in the second retainer member.

In another preferred embodiment, the method includes inserting a cylindrical protrusive portion extending generally inwardly from the first seal member into a notch defined in the first retainer member, inserting a cylindrical protrusive portion extending generally inwardly from the second seal member into a notch defined in the second retainer member prior to step (c), and pivoting the shroud downwardly. After pivoting the shroud downwardly, the method can also include inserting a protrusive portion extending generally downwardly from the first seal member into a notch defined in the first retainer member, and inserting a protrusive portion extending generally downwardly from the second seal member into a notch defined in the second retainer member. The steps of the method can be performed in any desired order.

In a preferred embodiment, the shroud extends between two walls that are part of a lavatory monument. In a preferred embodiment the assembly includes no mechanical fasteners (e.g., screws, bolts, rivets, etc.) and no RTV sealant. However, this is not a limitation and mechanical fasteners and/or RTV sealant can be used as desired.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

FIGS. 1-10 show a toilet module 10 in accordance with a preferred embodiment of the present invention. As shown, in a preferred embodiment, the toilet module 10 generally includes attachment assemblies 12 on both sides of a shroud 14. The shroud includes a toilet 16. The toilet 16 can be attached to or unitary with the shroud 14. The type of toilet or components thereof is not a limitation on the present invention. For example, the toilet 16 can include a bowl 18 and a hinged seat 20, as is known in the art.

Figure 3:
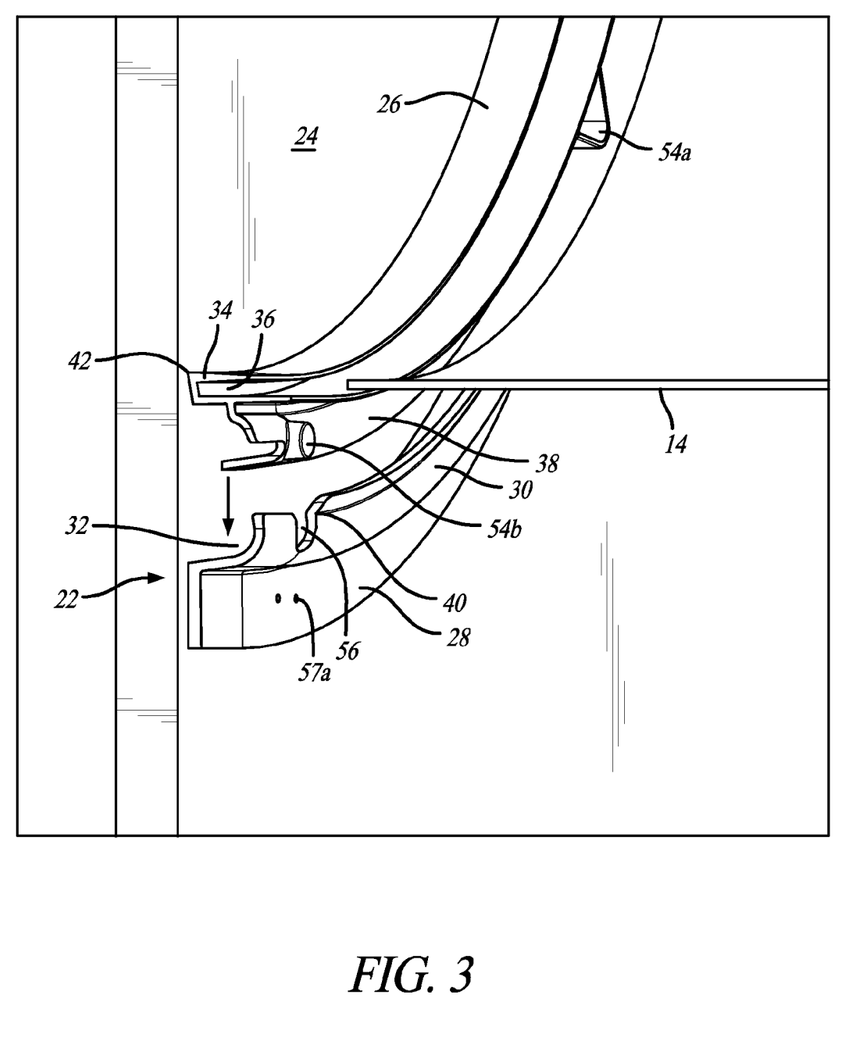
FIG. 3 is an exploded perspective view from the top showing a portion of the toilet module of FIG. 1.
Figure 4A:
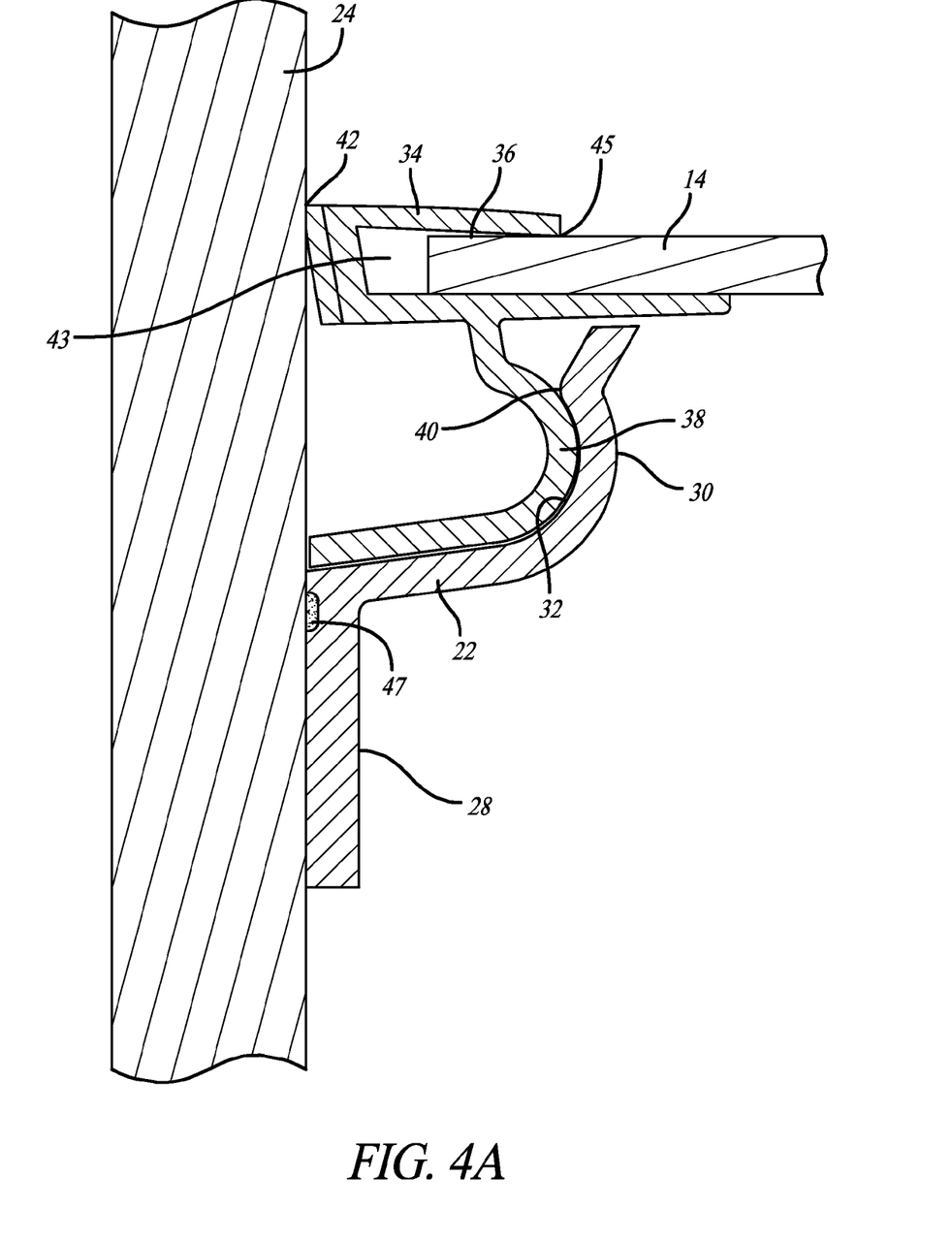
FIG. 4A is a cross-sectional view showing the shroud received in the groove of the seal member, the seal member received in the retainer member and the retainer member attached to the wall.
Figure 4B:
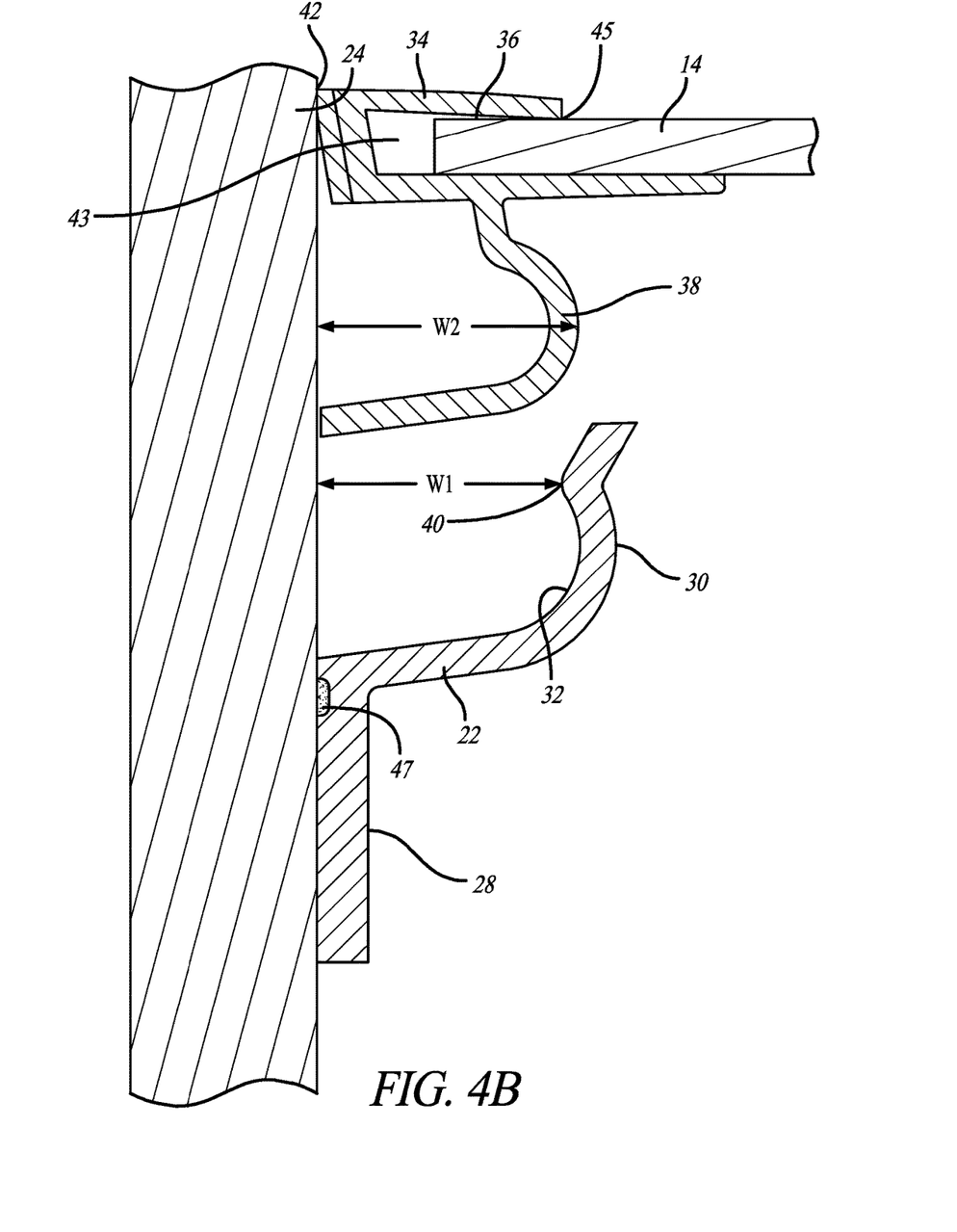
FIG. 4B is a cross-sectional view showing the shroud received in the groove of the seal member, the seal member exploded from the retainer member and the retainer member attached to the wall.

The attachment assemblies 12 are basically mirror images of one another. Therefore, for simplicities sake, only one attachment assembly 12 will be described herein. Generally, the attachment assembly 12 includes a retainer member 22 that is adapted to be secured to a wall 24 and a seal member 26. As is best shown in FIGS. 3-4, the retainer member 22 includes a wall attachment flange 28 and a press fit portion 30 extending outwardly from the wall attachment flange 28. The press fit portion 30 includes a channel 32 that is more clearly defined when the press fit portion 30 is attached to a wall, as shown in FIG. 3. The seal member includes a receiving portion 34 having a groove 36 defined therein and a bulge portion 38 that is received in the channel 32 of the press fit portion 30.

In a preferred embodiment, the seal member 26 is made of a pliable material, such as rubber, so that the bulge portion 38 can be pressed down and into the channel 32, as shown in FIG. 4A. As shown in FIG. 4B, the retainer member 22 includes a lip 40 thereon and the width W1 of the space between the lip 40 and wall 24 is less than the width W2 of the space between the innermost portion or peak of the bulge portion 38 and the wall 24. This requires the bulge portion 38 to be press fit into the channel 32, and the pliable nature of the bulge portion 38 allows this to happen.

The pliable nature of the seal member 26 also allows the shroud 14 to be received and retained in the groove 36, as shown in FIG. 4A. Furthermore, in a preferred embodiment, the seal member 26 includes a seal edge 42 that presses against the wall 24 and helps prevent liquid or other items from getting down into the channel 32. In a preferred embodiment, the seal edges 42 on both sides of the toilet module always seal against the wall 24, regardless of the width of the shroud 14. This is represented by the space or tolerance 43 shown in FIG. 4A between the outer edge of the shroud and the inner edge of the groove 36. This is made possible by the size or width of the retainer member 22 (female portion of the mating arrangement) and the bulge portion 38 (male portion of the mating arrangement) This sizing always keeps the seal edge 42 pressed against wall 24. In other words, the retainer member 22 ensures that the seal edge 42 is pressed to the wall 24 (the datum for the seal is the retainer member 22, not the shroud itself). And, the shroud 14 "floats" in the groove 36 (see space 43) to ensure the proper seal to the wall. Also, as shown in FIGS. 4A and 4B, the receiving portion 34 provides a seal 45 with the shroud.

Figure 5:
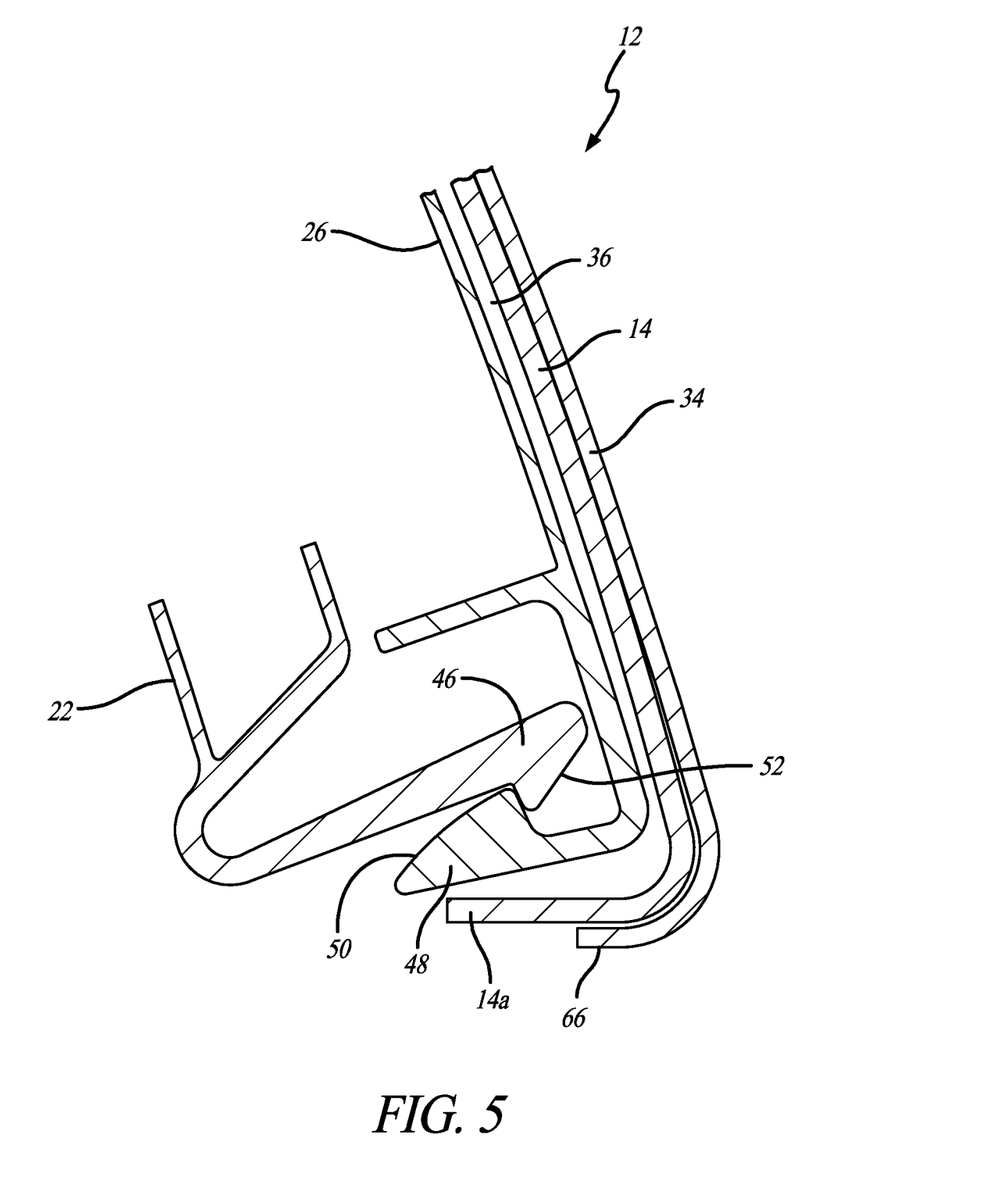
FIG. 5 is a cross-section of a portion of the toilet module of FIG. 1 showing the hook connection.

As shown in FIG. 5A-6B, in a preferred embodiment, the attachment assembly 12 includes a hook connection 44 at a bottom thereof. The retainer member 22 includes a first hook 46 and the seal member 26 includes a second hook 48. When the seal member 26 is pressed down on the retainer member 22, the second hook 48 includes a ramp portion 50 that rides or slides over a ramp portion 52 on the first hook 46 until the first and second hooks are engaged or latched, as shown in FIGS. 5 and 6A. To disengage the hooks, a user pulls generally downwardly on the second hook 48 and then pulls the seal member 26 and retainer member 22 apart. In a preferred embodiment, the first hook 46 is located on an extension member 60 that extends generally inwardly and downwardly from the wall attachment flange 28. Furthermore, in a preferred embodiment, the seal member 26 and retainer member 22 also include complementary cavities 62 and 64 that allow the first and second hooks 46 and 48 to engage one another (see FIG. 6B). The seal member 26 also can include a bottom seal extension 66 that partially defines the groove 36 and protects a bottom flange 14a of the shroud 14. In an embodiment, the bottom seal extension 66 engages the floor of the lavatory, thereby providing a seal.

Figure 7:
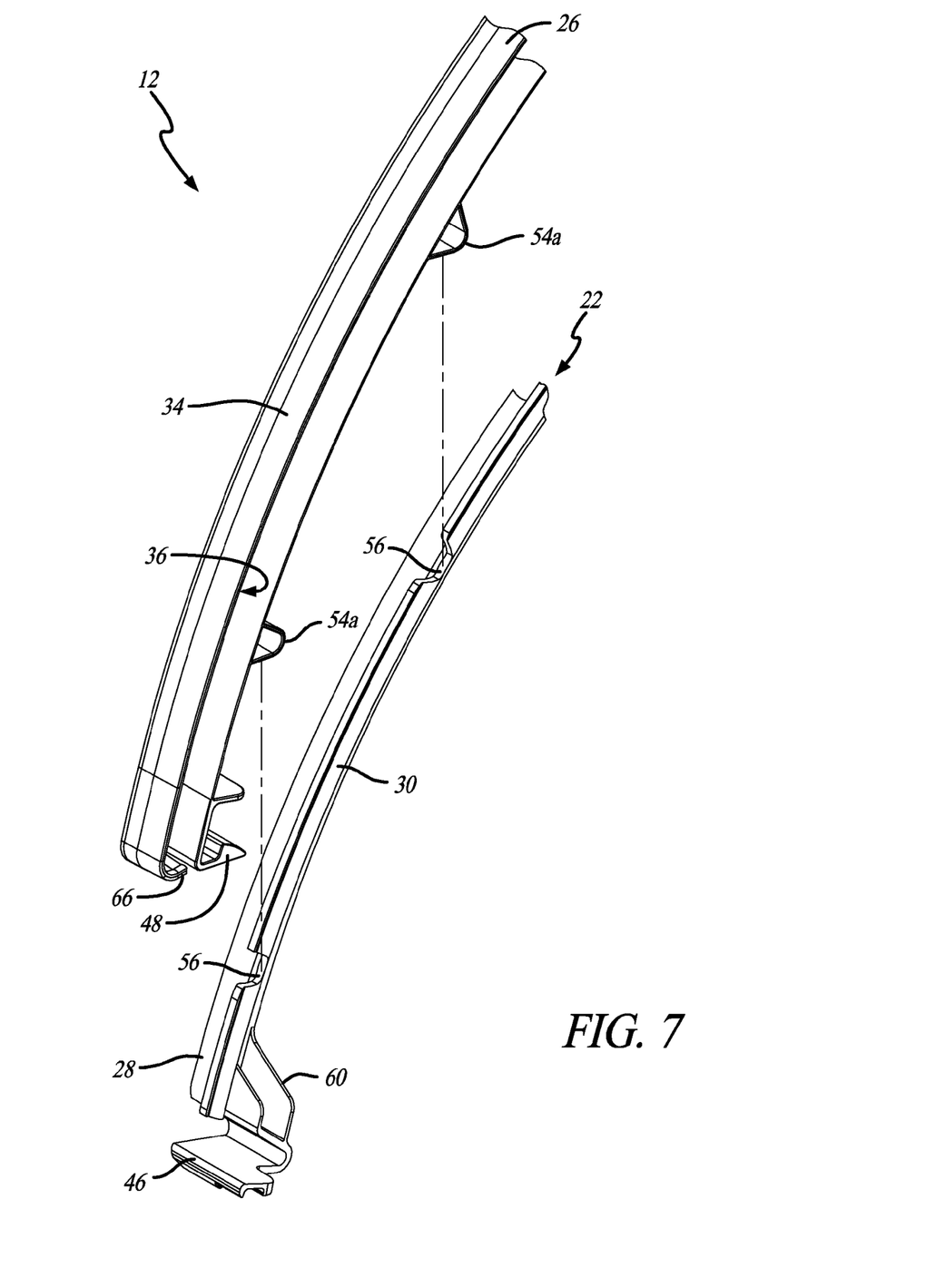
FIG. 7 is an exploded perspective view of the attachment assembly showing how the seal member connects to the retainer member.
Figure 8:
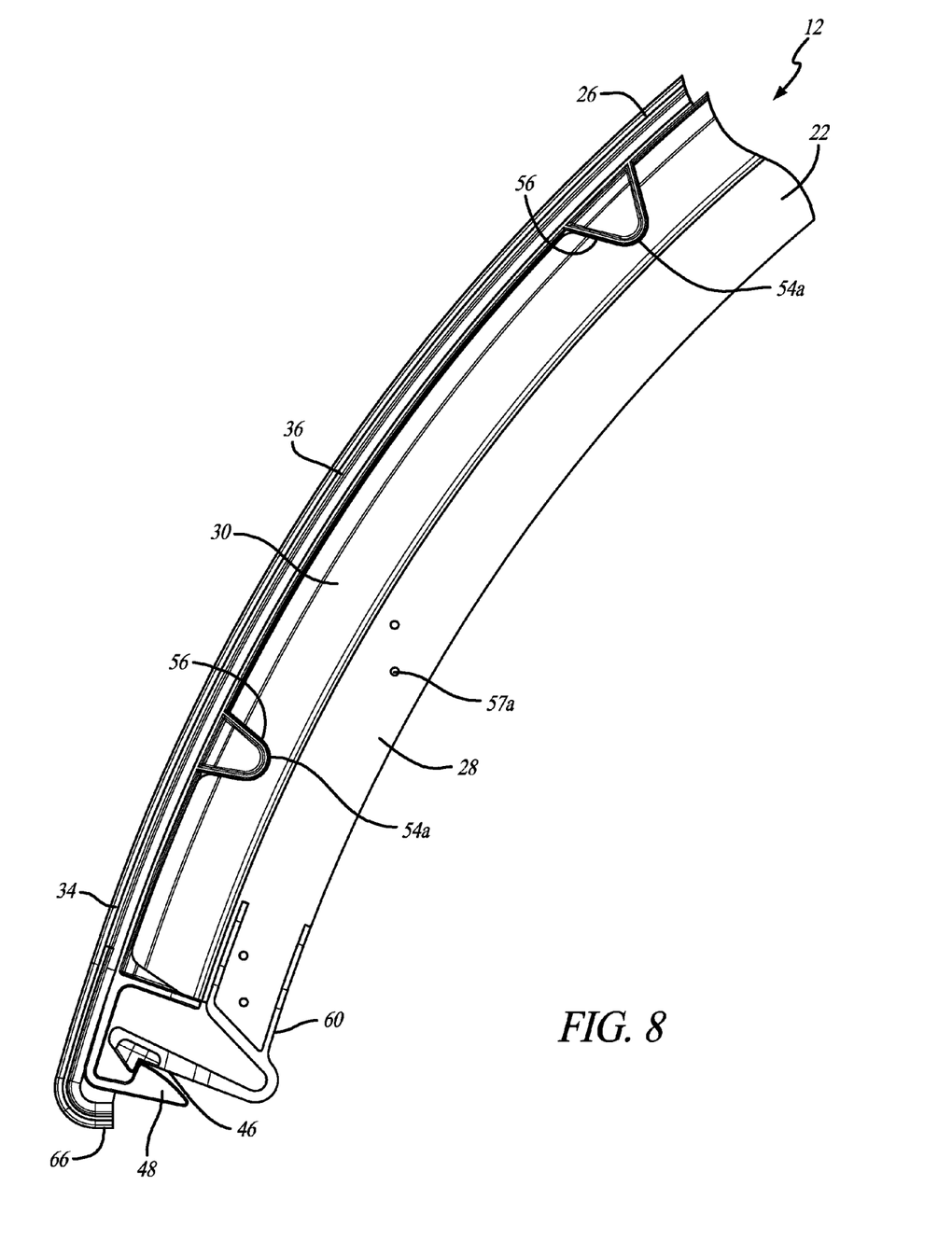
FIG. 8 is an elevational view of the attachment assembly showing the seal member connected to the retainer member.
Figure 9:
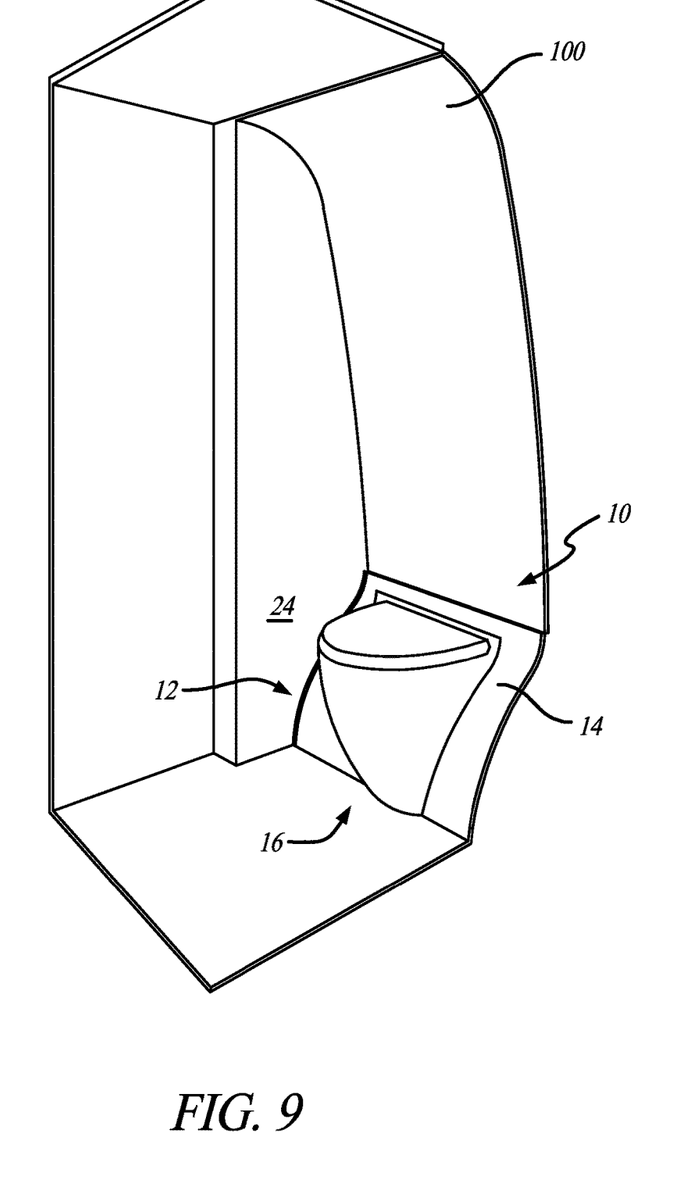
FIG. 9 is a perspective view of a lavatory with the toilet module of FIG. 1 installed therein.
Figure 10:
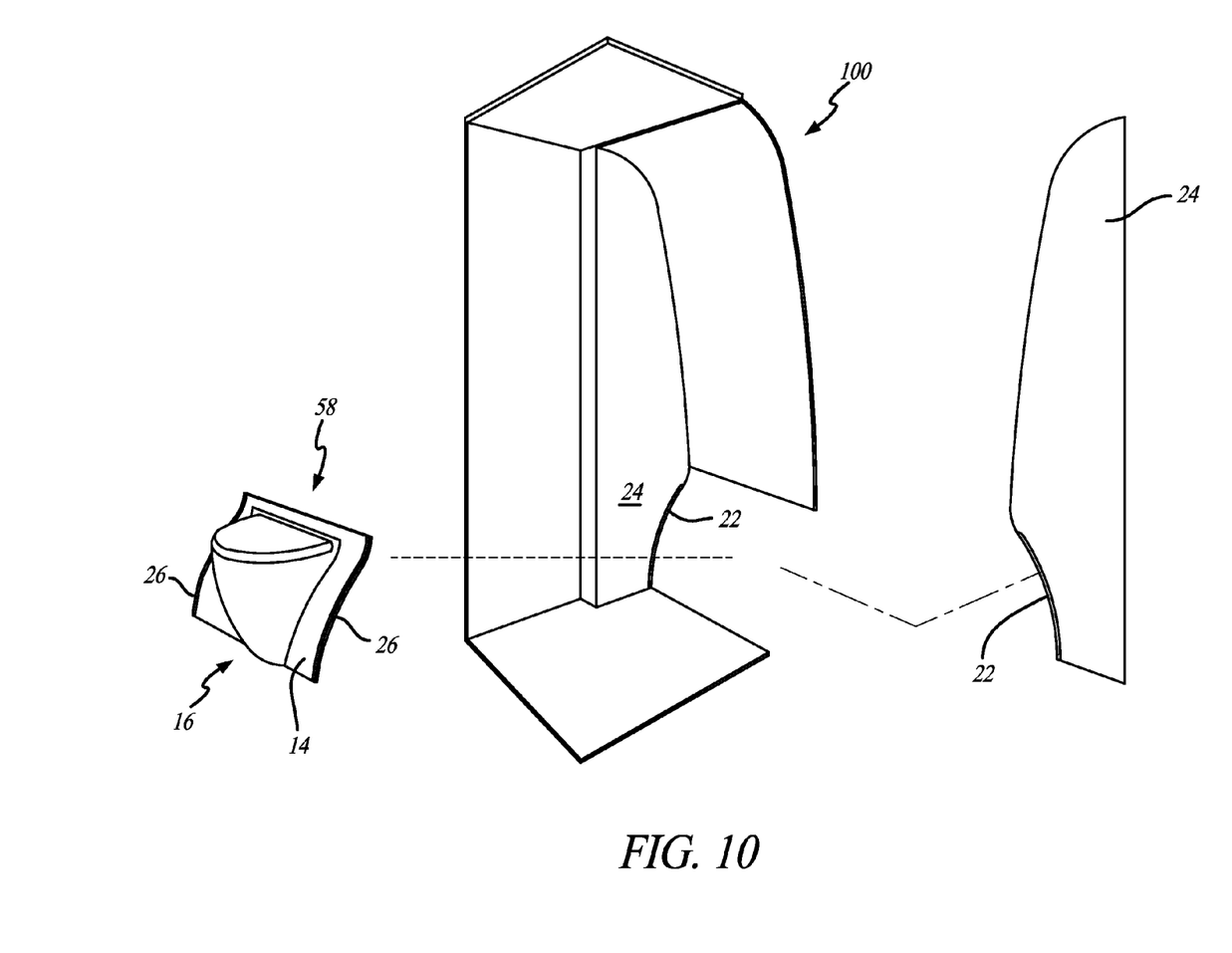
FIG. 10 is a perspective view of the lavatory of FIG. 7 with the toilet module exploded therefrom.

As shown in FIGS. 3 and 7-8, in a preferred embodiment, the attachment assembly 12 includes means for registering or aligning the seal member 26 with the retainer member 22. In a preferred embodiment, the seal member 26 includes protrusive portions 54a and 54b that extend downwardly 54a (see FIG. 7) and inwardly 54b (FIG. 3) that mate with notches 56 in the press fit portion 30. When installing or attaching the seal member 26 to the retainer member 22, the cylindrical protrusive portion 54b is placed in the corresponding notch 56 first and the seal member is pivoted downwardly until the downwardly extending protrusive portions 54a are received in the corresponding notches 56. Then, the hooks are engaged with one another as described above.

Figure 1:
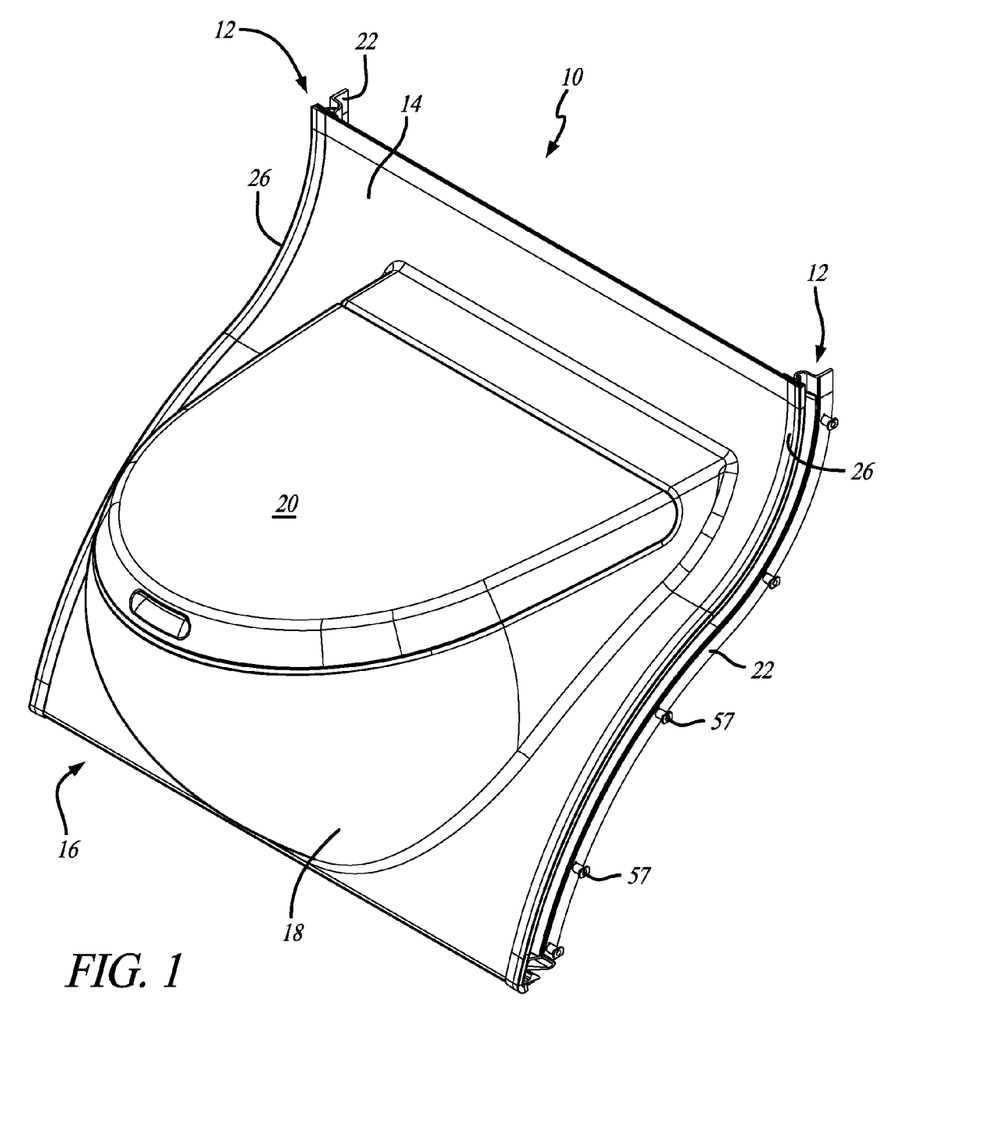
FIG. 1 is a perspective view of a toilet module in accordance with a preferred embodiment of the present invention.
Figure 6A:
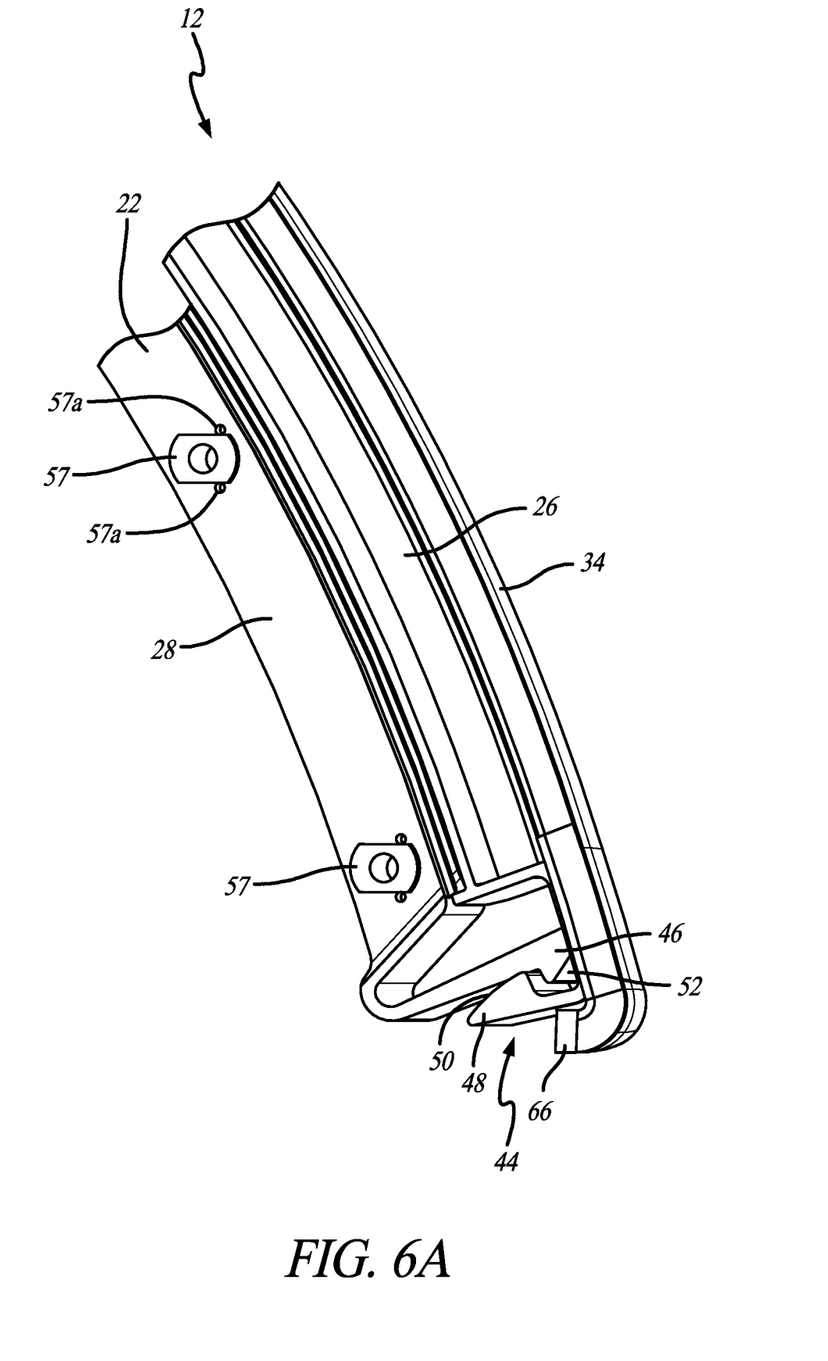
FIG. 6A is a perspective view of a portion of the toilet module of FIG. 1 showing the hook connection.
Figure 6B:
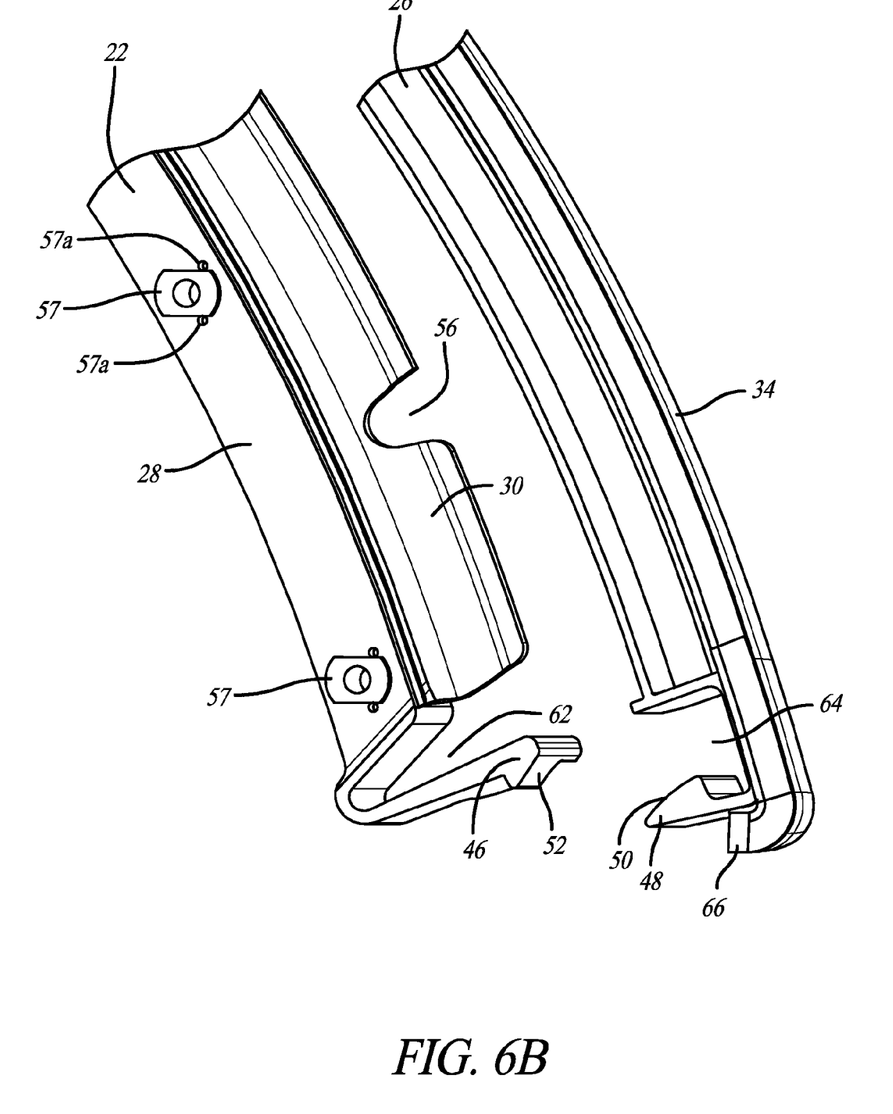
FIG. 6B is an exploded perspective view of the components shown in FIG. 6A.

It will be appreciated that the retainer member 22 can be attached to the wall 24 by any method, such as gluing, welding, riveting, threaded fasteners, etc. In a preferred embodiment, as shown in FIGS. 1, 6A and 6B, the wall attachment flange 28 includes inserts 57 extending outwardly therefrom that are inserted into openings in the walls and glued or potted therein. The adhesive can be inserted through openings 57a in the wall attachment flange 28. The wall attachment flange 28 can also include a channel 47 which can be filled with glue or adhesive to secure the flange to the wall 24. The channel 47 can be sized so as to measure and provide a predetermined amount of glue. The channel 47 can run the entire or at least part of the length of the wall attachment flange 28.

Figure 2:
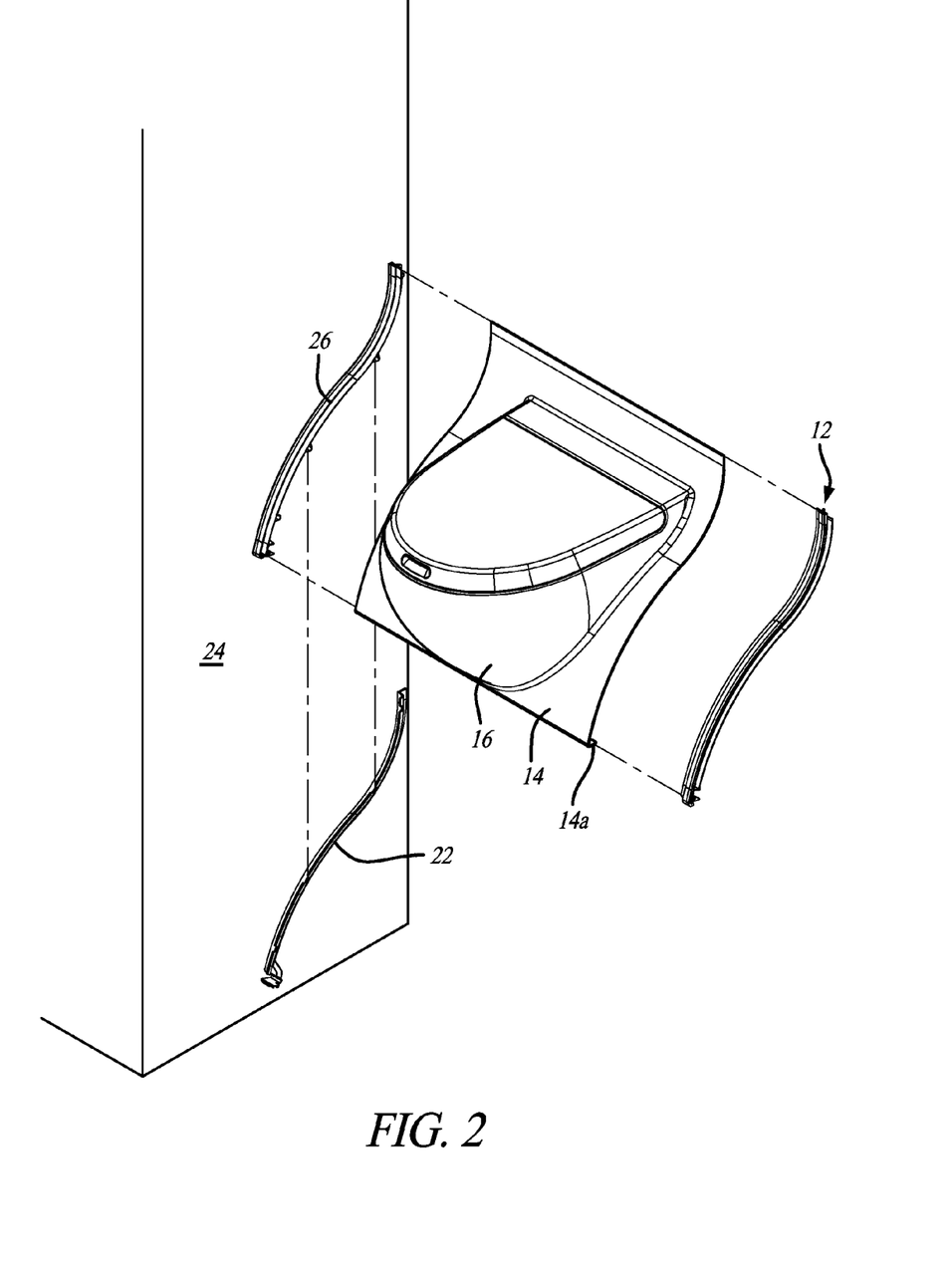
FIG. 2 is an exploded perspective view of the toilet module of FIG. 1 with one of the retainer members attached to the wall.

To install the toilet module 10, first, the retainer members 22 are secured to opposing walls 24 in a lavatory 100 and the seal members 26 are secured on opposite sides of the shroud 14 by placing the opposite sides of the shroud 14 in the grooves 36. As shown in FIGS. 2 and 5, the shroud 14 includes the bottom flange 14a that is inserted into a bottom portion of the groove 36. The cylindrical protrusive portions 54b are then placed in the corresponding notches 56 and the shroud 14 together with the seal members 26 (referred to herein as the shroud assembly 58) is pivoted downwardly until the downwardly extending protrusive portions 54a are received in the corresponding notches 56. Simultaneously, the seal members 26 are pushed inwardly/downwardly so that the bulge portions 38 are received in the channels 32. The second hooks 46 are pushed inwardly so that the ramp portions 50 ride up and over the ramp portions 52 of the first hooks 48, thereby engaging the hooks with one another. The steps for securing the shroud assembly 58 to the retainer members 22 can be done in any order.

It will be appreciated by those of ordinary skill in the art that modifications can be made to the present invention. For example, the means for registration or alignment can be reversed and the protrusions can be on the retainer member and the notches can be on the seal member. In another embodiment, the means for registration can be omitted and/or the hooks can be omitted.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A toilet module attachment assembly comprising:
    a retainer member that is adapted to be secured to a wall, wherein the retainer member includes a wall attachment flange and a press fit portion extending generally inwardly from the wall attachment flange, wherein when the retainer member is secured to the wall a channel is defined between the wall and the press fit portion, wherein the retainer member includes a first hook extending from the wall attachment flange, and
    a seal member that includes a bulge portion that is received in the channel of the retainer member, wherein the seal member includes a second hook that is engaged with the first hook, and wherein the seal member includes at least one protrusive portion extending therefrom that is received in a notch defined in the press fit portion.

2. The attachment assembly of claim 1 wherein the press fit portion includes a lip and the bulge portion includes an innermost peak, wherein when the retainer member is secured to the wall, a first width is defined between the lip and the wall and a second width is defined between the innermost peak of the bulge portion and the wall, wherein the first width is less than the second width.

3. The attachment assembly of claim 2 wherein the bulge portion extends generally downwardly.

4. The attachment assembly of claim 1 wherein the first and second hooks each include a ramp portion.

5. The attachment assembly of claim 1 wherein the protrusive portion is cylindrical and extends generally inwardly.

6. The attachment assembly of claim 1 wherein the wall attachment flange includes a plurality of inserts extending outwardly therefrom.

7. The attachment assembly of claim 6 wherein the wall attachment flange includes a plurality of openings defined therethrough that are each positioned adjacent one of the plurality of inserts, whereby adhesive can be inserted through the openings and onto the inserts.

8. The attachment assembly of claim 1 wherein the seal member includes an outer seal edge that is configured to contact the wall when the retainer member is secured to the wall.

9. A toilet module attachment assembly comprising:
    a retainer member that is adapted to be secured to a wall, wherein the retainer member includes a wall attachment flange having a plurality of inserts extending outwardly therefrom and a press fit portion extending generally inwardly from the wall attachment flange, wherein the press fit portion includes a lip, wherein when the retainer member is secured to the wall a channel is defined between the wall and the press fit portion and a first width is defined between the lip and the wall, wherein the retainer member includes a first hook extending from the wall attachment flange, and
    a seal member that includes a bulge portion that is received in the channel of the retainer member, wherein the bulge portion includes an innermost peak, wherein when the retainer member is secured to the wall a second width is defined between the innermost peak of the bulge portion and the wall, wherein the first width is less than the second width, wherein the seal member includes a second hook that is engaged with the first hook,
    wherein the seal member includes at least one protrusive portion extending therefrom that is received in a notch defined in the press fit portion.

10. The attachment assembly of claim 9 wherein the seal member includes an outer seal edge that is configured to contact the wall when the retainer member is secured to the wall.

11. The attachment assembly of claim 10 wherein the first and second hooks each include a ramp portion.

* * * * *